United States Patent
Walker et al.

(10) Patent No.: US 6,455,159 B1
(45) Date of Patent: Sep. 24, 2002

(54) OXIDATION PROTECTION FOR CARBON/CARBON COMPOSITES AND GRAPHITES

(75) Inventors: Terence B. Walker; Laurie A. Booker, both of South Bend, IN (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 09/507,414

(22) Filed: Feb. 18, 2000

(51) Int. Cl.⁷ .................................................. B32B 9/00
(52) U.S. Cl. ....................... 428/408; 428/368; 428/543; 428/689; 428/704; 427/113; 427/228; 252/397; 252/400.2; 252/502
(58) Field of Search ................................. 428/408, 212, 428/368, 689, 704, 543, 375, 306.6, 307.3; 427/226, 228, 314, 113, 215; 252/502, 397, 400.2

(56) References Cited

U.S. PATENT DOCUMENTS

| | | |
|---|---|---|
| 2,685,542 A | 8/1954 | Woodburn et al. |
| 3,174,872 A | 3/1965 | Fisher et al. |
| 3,342,627 A | 9/1967 | Paxton et al. |
| 3,814,699 A | 6/1974 | Baldieri et al. |
| 4,837,073 A | 6/1989 | McCallister et al. |
| 5,759,622 A | 6/1998 | Stover |

*Primary Examiner*—Deborah Jones
*Assistant Examiner*—Abraham Bahta
(74) *Attorney, Agent, or Firm*—Larry J. Palguta

(57) ABSTRACT

The invention provides for oxidatively resistant carbon/carbon composites and other graphite-like material, a method for the preparation of these materials, and their use in high temperature applications, preferably in brakes for airplanes. The carbon/carbon composite or graphite-like material, which is resistant to oxidation at high temperatures comprises a fiber-reinforced carbon/carbon composite or graphite in contact with a phosphoric acid based penetrant salt solution which contains the ions formed from the combination of the following: 10–80 wt % $H_2O$, 20–70 wt % $H_3PO_4$, 0–25 wt % $MnHPO_4 \cdot 1.6H_2O$, 0–30 wt % $Al(H_2PO_4)_3$, 0–2 wt % $B_2O_3$, 0–10 wt % $Zn_3(PO_4)_2$ and 0.1–25 wt % alkali metal mono-, di-, or tri-basic phosphate.

27 Claims, 2 Drawing Sheets

OXIDATION PROTECTION FOR CARBON/CARBON COMPOSITES AND GRAPHITES

FIELD OF THE INVENTION

The invention provides for oxidatively resistant carbon/carbon composites and other graphite-like material, a novel penetrant for effecting increased oxidation resistance of the carbon/carbon composites and other graphite-like material, a method for the preparation of these materials, and their use in high temperature applications, preferably in brakes for airplanes.

BACKGROUND OF THE INVENTION

When the carbon/carbon composites are utilized as a stack of discs in airplane brakes, they are required to absorb large amounts of kinetic energy in order to stop the aircraft during landing or in the event of a rejected take-off. During some of the stops, the carbon is heated to sufficiently high temperatures that surfaces exposed to air will oxidize. Some conventional carbon composites have the necessary thermal and mechanical properties required for specific brake designs; however, these conventional composites have open porosities (typically 5% to 10%) which permit internal oxidation. The internal oxidation weakens the material in and around the brake rotor lugs or stator slots, which are areas that transmit the torque during braking.

Damage associated with oxidation has led to premature removal of carbon brake discs on a variety of aircraft, from all current brake manufacturers. Potassium or sodium have, at times, been identified in the severely oxidized regions, and alkali (e.g. sodium and potassium) and alkaline earth elements are well known to catalyze carbon oxidation. Catalyzed oxidation is carbon oxidation that is accelerated by the presence of contaminating materials. These contaminating materials come into contact with the brake from cleaning and de-icing chemicals used on aircraft, and, in particular, from de-icers used on airport runways. These liquids, and other deicers or cleaners containing K or Na, can penetrate the porous carbon discs leaving catalytic deposits within the pores. When such contamination occurs, the rate of carbon loss by oxidation can be increased by as much as two orders of magnitude. The ability of these materials to catalyze oxidation in brake materials has been verified in the laboratory.

Thus, the overall objectives of the invention are to protect carbon/carbon composites or graphites at elevated temperatures up to and exceeding 850° C., and to significantly reduce catalytic oxidation at normal operating temperatures. Both field data and theoretical models indicate that modern carbon/carbon aircraft brakes frequently see peak temperatures above 850° C. and that some models may experience extended periods between 800° C. to 1200° C. over their service lives.

Phosphoric acid based penetrants have been used extensively to inhibit the oxidation of carbon/carbon composite articles, see for e.g., McAllister et al., U.S. Pat. No. 4,837,073, which is herein incorporated by reference. However, the applicability of these systems has typically been limited to temperatures below 700° C.

Through the use of a novel phosphoric acid penetrant, which is coated on the composite, the composite of the present invention has a significantly improved oxidative resistance at the high end of the typical operating temperature range and in the presence of high concentrations of known oxidation catalysts, such as potassium acetate, a common constituent in aircraft runway deicers.

SUMMARY OF THE INVENTION

Although, carbon/carbon composites and other carbon materials, such as graphite, rank among the most inert and least reactive materials known at high temperatures, oxidation is a highly significant cause of deterioration of strength and loss of material, thus retardation of the oxidation reactions could be highly beneficial in lowering consumption, both by direct oxidation and by lessening breakage caused by oxidation-induced loss of strength.

Accordingly, the present invention, in part, provides a material for effecting an oxidation inhibiting surface treatment on graphite and similar carbonaceous bodies.

The present invention also provides, in part, a material that forms an effective protection against oxidation of carbon/carbon composites and graphite-like materials that does not always require "conditioning" at elevated temperatures.

The present invention also provides, in part, a "paint-like" material that can be applied to carbon/carbon composites and graphite-like materials to achieve an oxidation prevention coating.

The present invention also provides, in part, a method for producing a "paint-like" material having long shelf life that can be applied to carbon/carbon composites and graphite-like materials to produce an oxidation prevention coating.

The oxidatively resistant carbon/carbon composites and graphite-like material according to the present invention are preferably used in brakes for airplanes, but may also be used in other high temperature applications, such as electrodes for arc melting of steel, mold stock for metal casting, rocket nozzles, furnace linings, and Hall cell anodes.

In particular, the present invention also provides, in part novel phosphoric acid penetrants, which are coated on the carbon/carbon material, thereby significantly improving the oxidative resistance of the material at the high end of the typical operating temperature range and in the presence of high concentrations of known oxidation catalysts, such as potassium acetate, a common constituent in aircraft runway deicers. Such a phosphoric acid-based penetrant salt solution contains the ions formed from the combination of the following: 10–80 wt % $H_2O$, 20–70 wt % $H_3PO_4$, 0–25 wt % $MnHPO_4 \cdot 1.6H_2O$, 0–30 wt % $Al(H_2PO_4)_3$, 0–2 wt % $B_2O_3$, 0–10 wt % $Zn_3(PO_4)_2$ and 0.1–25 wt % alkali metal mono-, di-, or tri-basic phosphate.

Advantages of the present invention will become more apparent hereinafter from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DETAILED DESCRIPTION OF THE INVENTION

Figure 1:
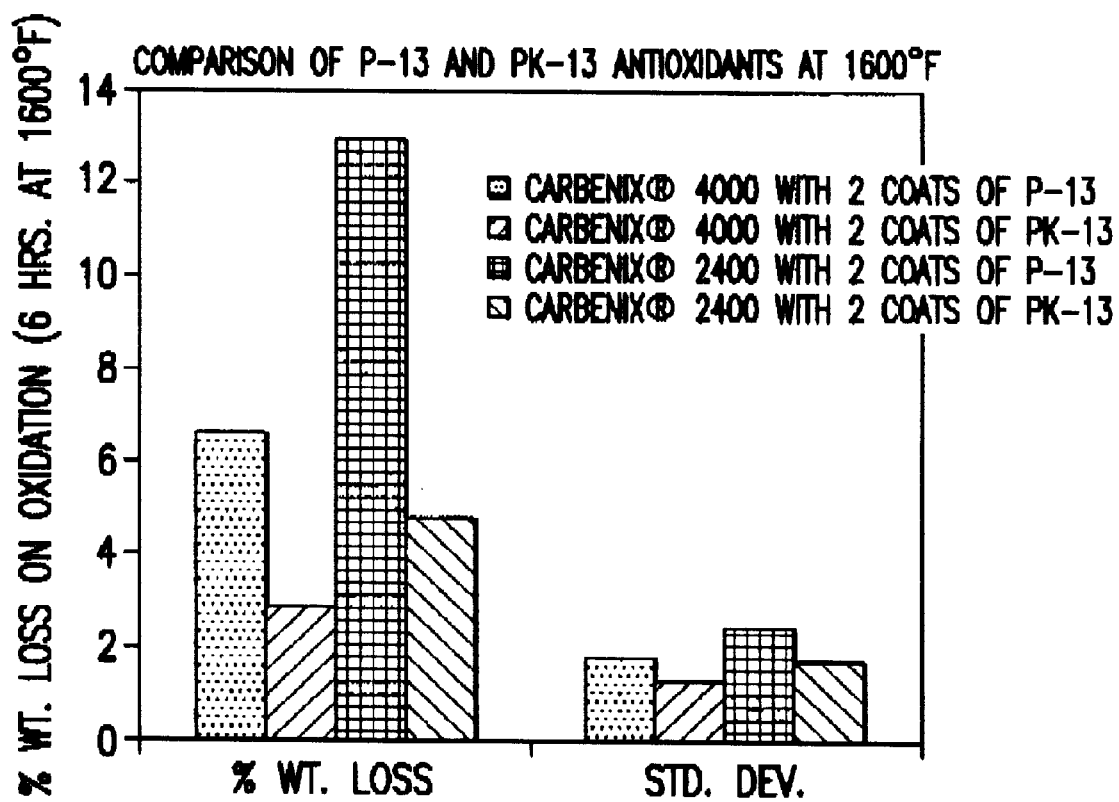
FIG. 1 is a chart showing the average weight loss and standard deviation for test specimens treated with the penetrant solutions and exposed to flowing air at a temperature of 1600° F. for 6 hours.

The present invention includes a surface treated carbon/carbon composite or graphite-like material, which is resistant to oxidation at high temperatures comprising:

a fiber-reinforced carbon/carbon composite or graphite in contact with a phosphoric acid based penetrant salt solution which contains the ions formed from the combination of the following: 10–80 wt % $H_2O$, 20–70 wt % $H_3PO_4$, 0–25 wt % $MnHPO_4.1.6H_2O$, 0–30 wt % $Al(H_2PO_4)_3$, 0–2 wt % $B_2O_3$, 0–10 wt % $Zn_3(PO_4)_2$ and 0.1–25 wt % alkali metal mono-, di-, or tri-basic phosphate, wherein at least one of $Al(H_2PO_4)_3$, $MnHPO_4.1.6H_2O$, and $Zn_3(PO_4)_2$ is present.

Herein the phrase "carbon-carbon composite" refers to a composite material utilizing carbon fibers embedded in a carbon matrix. "Graphite-like materials" include graphites and modifications thereof.

In one embodiment, the phosphoric acid based penetrant salt solution contains the ions formed from the combination of the following: 20–50 wt % $H_2O$, 30–55 wt % $H_3PO_4$, and 5–20 wt % alkali metal mono-, di-, or tri-basic phosphate.

In another embodiment, phosphoric acid based penetrant salt solution consists essentially of the ions formed from the combination of the following: 20–50 wt % $H_2O$, 30–55 wt % $H_3PO_4$, 0–15 wt % $MnHPO_4.1.6H_2O$, 2–15 wt % $Al(H_2PO_4)_3$, 0.5–2 wt % $B_2O_3$, 1–7 wt % $Zn_3(PO_4)_2$ and 10–20 wt % alkali metal dihydrogen phosphate.

In an alternative embodiment, the phosphoric acid based penetrant salt solution consists essentially of the ions formed from the combination of the following: 20–50% $H_2O$, 30–55% $H_3PO_4$, 2–15% $Al(H_2PO_4)_3$, 0.5–2% $B_2O_3$, and 10–20% alkali metal dihydrogen phosphate by weight.

In yet another embodiment, the phosphoric acid based penetrant salt solution consists essentially of the ions formed from the combination of the following: 20–50 wt % $H_2O$, 30–55 wt % $H_3PO_4$, 1–7 wt % $Zn_3(PO_4)_2$ and 10–20 wt % alkali metal dihydrogen phosphate by weight.

The phosphoric acid based penetrant salt solution consists essentially of the ions formed from the combination of the following: 20–50 wt % $H_2O$, 30–55 wt % $H_3PO_4$, 2–15 wt % $MnHPO_4.1.6H_2O$ and 10–20 wt % alkali metal dihydrogen phosphate by weight.

The alkali metal mono-, di-, or tri-basic phosphate includes $NaH_2PO_4$, $KH_2PO_4$ or mixtures thereof. Preferably, the alkali metal mono-, di-, or tri-basic phosphate is $KH_2PO_4$.

The skilled artisan would readily find it obvious that the salt solutions formed with the above formulations can be formed with other salts. For instance, it is possible to replace $Al(H_2PO_4)_3$ with $AlNO_3$, since at the curing temperature $AlNO_3 + 3H_3PO_4\ Al(H_2PO_4)_3$. Also, a mixture of alkali metal hydroxide and phosphoric acid, in the proper stoichiometry, will form alkali metal mono-, di-, or tri-basic phosphate in solution. These types of modifications are considered within the skill of the artisan, and as such, are encompassed by the present invention.

The present invention also includes a process for improving the oxidative resistance of a carbon/carbon composite or graphite-like material comprising treating the surface of the carbon/carbon composite or graphite-like material with a penetrant solution comprising any one of the above formulations. The surface of the carbon/carbon composite or graphite-like material is impregnated with the penetrant solution by brush painting, dipping, spraying or other painting techniques followed by curing the surface treated carbon/carbon composite or graphite-like material at a temperature of 500 to 900° C.

Additionally, the present invention includes a process for preparing a carbon/carbon composite or graphite-like material having resistance to oxidation comprising treating the surface of the carbon/carbon composite or graphite-like material with a penetrant solution comprising any one of the above formulations. The surface of the carbon/carbon composite or graphite-like material is treated with the penetrant solution by brush painting, dipping, or other painting techniques followed by curing the surface treated carbon/carbon composite or graphite-like material at a temperature of 500 to 900° C. Typically, the surface is treated with one to three coats of the penetrant solution, and the curing step is usually accomplished in one to six hours.

The penetrant solution may additionally contain an amount of a compatible wetting agent selected from the group consisting of polyols, alkoxylated monohydric alcohols, silicone surfactant. The wetting agent is typically present in an amount from about 0.3% to about 3%, or from about 0.5% up to about 2%, or from about 0.75% up to about 1.5% by weight of the combination of the (a) and (b). In one embodiment, the wetting agent is present in an amount from about 0.5% to about 1% by weight of the combination of (a) and (b). The wetting agent is generally present in the aqueous composition in an amount from about 0.1% up to about 2%, or from about 0.3% up to about 1% by weight of the aqueous composition.

In another embodiment, the penetrant solution has essentially no hydrochloric acid, tin oxides, silicon oxides, titanium oxides or lithium compounds.

In order to protect carbon from rapid oxidation by catalysis from Na, K, or other metals in contaminating liquids encountered during service, the metal phosphate deposits should be distributed uniformly throughout the pores (e.g. with not more than about 1 mm separation between deposits) to a depth sufficient to cover the range affected by $O_2$ diffusing in from exposed surfaces (about 1 cm). The process described here has provided such deposits.

Carbon/Carbon Substrate

Carbon-carbon composites are generally prepared from carbon preforms. Carbon preforms are made of carbon fibers, which may be formed from pre-oxidized acrylonitrile resin. In one embodiment, these fibers can be layered together to form a shape, such as a friction brake. The shape is heated and infiltrated with methane or another pyrolyzable carbon source to form the carbon-carbon composites. In one embodiment, the carbon-carbon composite has a density from about 1.6 to about 1.9 g/cm³. A particularly useful carbon-carbon composite has a density of about 1.75 g/cm³. Carbon-carbon composites and methods of their manufacture are known to those in the art. A comprehensive reference in this area is *Carbon-Carbon Materials and Composites,* John D. Buckley and Dan D. Edie, Noyes Publications, 1993, which is herein incorporated by reference.

Even though the invention may be applied to various carbon/carbon materials, testing and evaluation, as described below, was done on CARBENIX® 4000 brand of carbon/carbon composite material marketed by Honeywell International, INC. (formerly AlliedSignal, Inc.), an aircraft brake carbon/carbon composite friction material, consisting of non-woven PAN precursor carbon fibers, densified with carbon utilizing CVD, and CARBENIX® 2400 brand of carbon/carbon composite material marketed by Honeywell International, INC. (formerly AlliedSignal, Inc.), an aircraft brake carbon/carbon composite friction material, consisting of pitch precursor carbon fibers, densified with carbonized phenolic resin and with carbon from CVD.

Treatment Application

A solution, as described below, is applied to the composite surface by brush painting, dipping, or other painting techniques. Since substantial porosity exists in these materials, substantial subsurface penetration occurs. The materials are then "cured" at temperatures from 500 to 900° C. to form non-soluble refractory compounds or mixtures.

Although the cure rates are not critical, a typical curing profile includes raising the temperature of the sample from room temperature at a rate of 100° C./hour and holding at the peak temperature for two hours. The curing is performed in an inert atmosphere, typically with nitrogen, argon and/or helium, but nitrogen is preferred. High temperature curing is preferred and ensures that the phosphoric acid is dehydrated thereby rendering the materials insoluble.

Penetrant Application

A variety of phosphoric acid based anti-oxidant penetrants may be used to obtain oxidation resistance in carbon/carbon composites. Typical penetrant formulations are shown in Chart I below (Ref. U.S. Pat. No. 4,837,073). In this invention, these formulations are modified by the addition of between 0.1 part and 25 parts/hundred of an alkali metal phosphate, e.g. potassium or sodium phosphates, or a mixture thereof.

CHART I

Penetrant Solutions
Solution Components by Wt. %

| Penetrant Designation | $H_2O$ | $H_3PO_4$, 85% | $MnHPO_4$·$1.6H_2O$ | $Al(H_2PO_4)_3$ 50% | $B_2O_3$ | $Zn_3(PO_4)_2$ |
|---|---|---|---|---|---|---|
| A | 22.0 | 36.8 | 5.7 | 26.8 | 1.8 | 6.9 |
| B | 27.7 | 46.3 | 3.6 | 16.9 | 1.1 | 4.3 |
| C | 29.6 | 49.5 | 2.9 | 13.6 | 0.9 | 3.5 |
| D | 31.9 | 53.2 | 2.1 | 9.7 | 0.6 | 2.5 |
| E | 30.1 | 50.3 | — | 18.4 | 1.2 | — |
| F | 37.0 | 61.9 | — | — | — | 1.1 |
| G | 32.6 | 54.4 | 13.0 | — | — | — |

Oxidation Testing of Improved Antioxidation Formula (1600° F.)

Test specimens (1.9" diameter, 0.230" thick cylindrical coupons, CARBENIX®4000 and CARBENIX®2400) were exposed to flowing air (3 scfh) at a temperature of 1600° F. (871° C.) for 6 hours. Weight loss under these conditions was measured to evaluate effectiveness of oxidation protection. Oxidative weight loss directly measures loss of heat-sink mass as would be seen with field oxidation of carbon/carbon composite friction materials. Additionally, a strong correlation has been shown between weight loss due to oxidation and loss of structural strength. Twenty specimens were tested for each composition. Average weight loss due to oxidation and the standard deviation for each group are shown in the chart of FIG. 1. (P-13 is Penetrant C, described in Chart 1 above. PK-13 is Penetrant C modified with 12 weight % of potassium dihydrogen phosphate ($KH_2PO_4$).)

Figure 2:
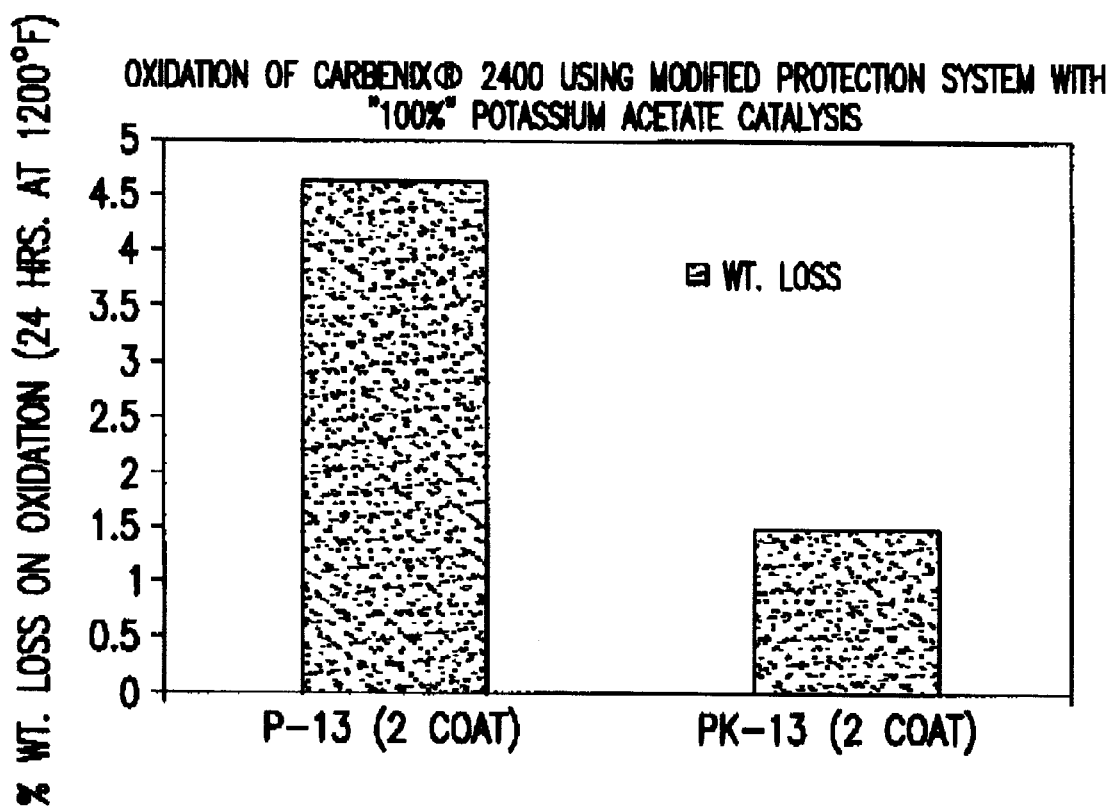
FIG. 2 is a chart showing the average weight loss for test specimens treated with the penetrant solutions and exposed to flowing air at a temperature of 1200° F. for 24 hours.

Test specimens (1.9" diameter, 0.230" thick cylindrical coupons, CARBENIX®2400) were treated with 2 coats of the P-13 and PK-13 penetrants as defined above and then exposed to a concentrated solution of potassium acetate. (176,000 ppm potassium, equivalent to undiluted runway de-icer.) Samples were dried to remove residual water and then exposed to flowing air at 1200° F. for 24 hours. Previous studies have shown that potassium acetate is a strong catalyst for oxidation of carbon at these temperatures. Additionally, analytical testing of brakes with oxidation damage in the field have shown the presence of large amounts of potassium acetate. Thirty samples were tested for each composition. Results are shown in the chart of FIG. 2.

While the invention has been explained in relation to its preferred embodiments, it is to be understood that various modifications thereof will become apparent to those skilled in the art upon reading the specification. Therefore, it is to be understood that the invention disclosed herein is intended to cover such modifications as fall within the scope of the appended claims.

What is claimed is:

1. A surface treated carbon/carbon composite or graphitic material, which is resistant to oxidation at high temperatures comprising:

a fiber-reinforced carbon/carbon composite or graphitic material in contact with a phosphoric acid based penetrant salt solution which comprises the ions formed from the combination of the following: 10–80 wt % $H_2O$, 20–70 wt % $H_3PO_4$, 0–25 wt % $MnHPO_4$·$1.6H_2O$, 0–30 wt % $Al(H_2PO_4)_3$, 0–2 wt % $B_2O_3$, 0–10 wt % $Zn_3(PO_4)_2$ and 0.1–25 wt % alkali metal mono-, di-, or tri-basic phosphate, wherein at least one of $Al(H_2PO_4)_3$, $MnHPO_4$·$1.6H_2O$, and $Zn_3(PO_4)_2$ is present.

2. The surface treated carbon/carbon composite or graphitic material according to claim 1, wherein the phosphoric acid based penetrant salt solution comprises the ions formed from the combination of the following: 20–50 wt % $H_2O$, 30–55 wt % $H_3PO_4$, and 5–20 wt % alkali metal mono-, di-, or tri-basic phosphate by weight.

3. The surface treated carbon/carbon composite or graphitic material according to claim 1, wherein the phosphoric acid based penetrant salt solution consists essentially of the ions formed from the combination of the following: 20–50 wt % $H_2O$, 30–55 wt % $H_3PO_4$, 0–15 wt % $MnHPO_4$·$1.6H_2O$, 2–15 wt % $Al(H_2PO_4)_3$, 0.5–2 wt % $B_2O_3$, 1–7 wt % $Zn_3(PO_4)_2$ and 10–20 wt % alkali metal mono-, di-, or tri-basic phosphate by weight.

4. The surface treated carbon/carbon composite or graphitic material according to claim 1, wherein the phosphoric acid based penetrant salt solution consists essentially of the ions formed from the combination of the following: 20–50 wt % $H_2O$, 30–55 wt % $H_3PO_4$, 2–15 wt % $Al(H_2PO_4)_3$, 0.5–2 wt % $B_2O_3$, and 10–20 wt % alkali metal mono-, di-, or tri-basic phosphate by weight.

5. The surface treated carbon/carbon composite or graphitic material according to claim 1, wherein the phosphoric acid based penetrant salt solution consists essentially of the ions formed from the combination of the following: 20–50 wt % $H_2O$, 30–55 wt % $H_3PO_4$, 1–7 wt % $Zn_3(PO_4)_2$ and 10–20 wt % alkali metal mono-, di-, or tri-basic phosphate by weight.

6. The surface treated carbon/carbon composite or graphitic material according to claim 1, wherein the phosphoric acid based penetrant salt solution consists essentially of the ions formed from the combination of the following: 20–50 wt % $H_2O$, 30–55 wt % $H_3PO_4$, 2–15 wt % $MnHPO_4$·$1.6H_2O$ and 10–20 wt % alkali metal mono-, di-, or tri-basic phosphate by weight.

7. The surface treated carbon/carbon composite or graphitic material according to claim 1, wherein the carbon/carbon composite consists of pitch precursor carbon fibers densified with carbonized phenolic resin and with carbon deposited by chemical vapor deposition.

8. The surface treated carbon/carbon composite or graphitic material according to claim 1, wherein the alkali metal mono-, di-, or tri-basic phosphate is selected from the group consisting of $NaH_2PO_4$, $KH_2PO_4$ and mixtures thereof.

9. The surface treated carbon/carbon composite or graphitic material according to claim 1, wherein the alkali metal mono-, di-, or tri-basic phosphate is $KH_2PO_4$.

10. The surface treated carbon/carbon composite or graphitic material according to claim 1, wherein the phosphoric acid based penetrant salt solution contains essentially no HCl, tin oxides, silicon oxides, titanium oxides or lithium compounds.

11. A process for improving the oxidative resistance of a carbon/carbon composite or graphitic material comprising treating the surface of the carbon/carbon composite or graphitic material with a phosphoric acid based penetrant salt solution which comprises the ions formed from the combination of the following:

10–80 wt % $H_2O$, 20–70 wt % $H_3PO_4$, 0–25 wt % $MnHPO_4 \cdot 1.6H_2O$, 0–30 wt % $Al(H_2PO_4)_3$, 0–2 wt % $B_2O_3$, 0–10 wt % $Zn_3(PO_4)_2$ and 0.1–25 wt % alkali metal mono-, di-, or tri-basic phosphate, wherein at least one of $Al(H_2PC)_4)_3$, $MnHPO_4 \cdot 1.6H_2O$, and $Zn_3(PO_4)_2$ is present.

12. The process for improving the oxidative resistance of a carbon/carbon composite or graphitic material according to claim 11, wherein the surface of the carbon/carbon composite or graphitic material is treated with the penetrant solution by painting or dipping.

13. The process for improving the oxidative resistance of a carbon/carbon composite or graphitic material according to claim 11, further comprising curing the surface treated carbon/carbon composite or graphitic material at a temperature of 500 to 900° C.

14. The process for improving the oxidative resistance of a carbon/carbon composite or graphitic material according to claim 11, wherein the phosphoric acid based penetrant salt solution contains essentially no HCl, tin oxides, silicon oxides, titanium oxides or lithium compounds.

15. A process for preparing a carbon/carbon composite or graphitic material having resistance to oxidation comprising treating the surface of the carbon/carbon composite or graphitic material with a phosphoric acid based penetrant salt solution which comprises the ions formed from the combination of the following:

10–80 wt % $H_2O$, 20–70 wt % $H_3PO_4$, 0–25 wt % $MnHPO_4 \cdot 1.6H_2O$, 0–30 wt % $Al(H_2PO_4)_3$, 0–2 wt % $B_2O_3$, 0–10 wt % $Zn_3(PO_4)_2$ and 0.1–25 wt % alkali metal mono-, di-, or tri-basic phosphate, wherein at least one of $Al(H_2PO_4)_3$, $MnHPO_4 \cdot 1.6H_2O$, and $Zn_3(PO_4)_2$ is present.

16. The process for preparing a carbon/carbon composite or graphitic material having resistance to oxidation according to claim 15, wherein the phosphoric acid based penetrant salt solution contains essentially no HCl, tin oxides, silicon oxides, titanium oxides or lithium compounds.

17. A phosphoric acid based penetrant solution for improving the oxidative resistance of a carbon/carbon composite or graphitic material, said solution comprising the ions formed from the combination of: 10–80 wt % $H_2O$, 20–70 wt % $H_3PO_4$, 0–25 wt % $MnHPO_4 \cdot 1.6H_2O$, 0–30 wt % $Al(H_2PO_4)_3$, 0–2 wt % $B_2O_3$, 0–10 wt % $Zn_3(PO_4)_2$ and 0.1–25 wt % alkali metal mono-, di-, or tri-basic phosphate, wherein at least one of $Al(H_2PO_4)_3$, $MnHPO_4 \cdot 1.6H_2O$, and $Zn_3(PO_4)_2$ is present.

18. The phosphoric acid based penetrant solution according to claim 17, comprising the ions formed from the combination of: 20–50 wt % $H_2O$, 30–55 wt % $H_3PO_4$, and 5–20 wt % alkali metal mono-, di-, or tri-basic phosphate by weight.

19. The phosphoric acid based penetrant solution according to claim 17, consisting essentially of the ions formed from the combination of: 20–50 wt % $H_2O$, 30–55 wt % $H_3PO_4$, 0–15 wt % $MnHPO_4 \cdot 1.6H_2O$, 2–15 wt % $Al(H_2PO_4)_3$, 0.5–2 wt % $B_2O_3$, 1–7 wt % $Zn_3(PO_4)_2$ and 10–20 wt % alkali metal mono-, di-, or tri-basic phosphate by weight.

20. The phosphoric acid based penetrant solution according to claim 17, consisting essentially of the ions formed from the combination of: 20–50 wt % $H_2O$, 30–55 wt % $H_3PO_4$, 2–15 wt % $Al(H_2PO_4)_3$, 0.5–2 wt % $B_2O_3$, and 10–20 wt % alkali metal mono-, di-, or tri-basic phosphate.

21. The phosphoric acid based penetrant solution according to claim 17, consisting essentially of the ions formed from the combination of: 20–50 wt % $H_2O$, 30–55 wt % $H_3PO_4$, 1–7 wt % $Zn_3(PO_4)_2$ and 10–20 wt % alkali metal mono-, di-, or tri-basic phosphate.

22. The phosphoric acid based penetrant solution according to claim 17, consisting essentially of the ions formed from the combination of: 20–50 wt % $H_2O$, 30–55 wt % $H_3PO_4$, 2–15 wt % $MnHPO_4 \cdot 1.6H_2O$ and 10–20 wt % alkali metal mono-, di-, or tri-basic phosphate.

23. The phosphoric acid based penetrant solution according to claim 17, wherein the alkali metal mono-, di-, or tri-basic phosphate is selected from the group consisting of $NaH_2PO_4$, $KH_2PO_4$ and mixtures thereof.

24. The phosphoric acid based penetrant solution according to claim 17, wherein the alkali metal mono-, di-, or tri-basic phosphate is $KH_2PO_4$.

25. The phosphoric acid based penetrant solution according to claim 17, wherein the phosphoric acid based penetrant salt solution contains essentially no HCl, tin oxides, silicon oxides, titanium oxides or lithium compounds.

26. The surface treated carbon/carbon composite or graphitic material according to claim 1, wherein the phosphoric acid based penetrant salt solution contains 10–20 wt % alkali metal mono- or di-basic phosphate and essentially no HCl.

27. The process for improving the oxidative resistance of a carbon/carbon composite or graphitic material according to claim 11, wherein the phosphoric acid based penetrant salt solution contains 10–20 wt % alkali metal mono- or di-basic phosphate and essentially no HCl.

* * * * *

UNITED STATES PATENT AND TRADEMARK OFFICE
CERTIFICATE OF CORRECTION

PATENT NO.   : 6,455,159 B1
DATED        : September 24, 2002
INVENTOR(S)  : Walker et al.

It is certified that error appears in the above-identified patent and that said Letters Patent is hereby corrected as shown below:

Title page,
Item [57], ABSTRACT,
Line 12, delete "$Al(H_2PO_4)_3$" and insert therefor -- $AlPO_4$ --.

Column 2,
Line 42, delete "$Al(H_2PO_4)_3$" and insert therefor -- $AlPO_4$ --.

Column 3,
Lines 5, 8, 21, 26 and 45, delete "$Al(H_2PO_4)_3$" and insert therefor -- $AlPO_4$ --.

Column 5,
Chart 1, column 5, delete "$Al(H_2PO_4)_3$" and insert therefor -- $AlPO_4$ --.

Column 6,
Lines 17, 20, 33 and 40, delete "$Al(H_2PO_4)_3$" and insert therefor -- $AlPO_4$ --.

Column 7
Lines 13, 40 and 43, delete "$Al(H_2PO_4)_3$" and insert therefor -- $AlPO_4$ --.

Column 8,
Lines 2, 15 and 21, delete "$Al(H_2PO_4)_3$" and insert therefor -- $AlPO_4$ --.

Signed and Sealed this

Fourth Day of February, 2003

JAMES E. ROGAN
*Director of the United States Patent and Trademark Office*